United States Patent
Schneider

(10) Patent No.: US 8,432,687 B2
(45) Date of Patent: Apr. 30, 2013

(54) ANSWER BRACELET

(76) Inventor: Cole Patrick Schneider, Orlando, FL (US)

( * ) Notice: Subject to any disclaimer, the term of this patent is extended or adjusted under 35 U.S.C. 154(b) by 83 days.

(21) Appl. No.: 12/932,274

(22) Filed: Feb. 23, 2011

(65) Prior Publication Data
US 2012/0212922 A1    Aug. 23, 2012

(51) Int. Cl.
*G06F 1/16* (2006.01)

(52) U.S. Cl.
USPC .............. 361/679.55; 361/807; 361/679.02; 361/679.03; 361/679.09; 361/679.4

(58) Field of Classification Search .......... 361/807, 361/809, 810, 679.01, 679.02, 679.03, 679.09, 361/679.4, 679.55
See application file for complete search history.

(56) References Cited

U.S. PATENT DOCUMENTS

| | | | |
|---|---|---|---|
| 2002/0105859 A1* | 8/2002 | Davidson et al. | 368/13 |
| 2005/0152227 A1* | 7/2005 | Saunier | 368/282 |
| 2011/0096481 A1* | 4/2011 | Ueno | 361/679.01 |
| 2011/0249378 A1* | 10/2011 | Yoo | 361/679.01 |
| 2011/0319024 A1* | 12/2011 | Fish | 455/41.3 |
| 2012/0069716 A1* | 3/2012 | Peng | 368/10 |
| 2012/0081852 A1* | 4/2012 | Maravilla et al. | 361/679.03 |

* cited by examiner

*Primary Examiner* — Hoa C Nguyen

(57) ABSTRACT

An answer bracelet with a circular bracelet band suitable for wearing an a person's wrist. A hollowed out area in the top of the bracelet band houses a digital display, a microprocessor, a printed circuit board, a start switch, a tilt switch, a battery power supply and an audio emitting device. A top cover panel covers the hollowed out portion and the embedded electronics. The battery can be accessed by removing a bottom cover located on the underside of the hollowed out area. When a user presses the start button and shakes the bracelet, the tilt switch sends a signal to the microprocessor whereupon the microprocessor causes the audio device to produce a short burst of sound and then randomly selects one of a plurality of messages stored in the microprocessor and displays the message on the digital display for a predetermined period of time. Then the message disappears making the bracelet display ready for the next use.

2 Claims, 4 Drawing Sheets

ANSWER BRACELET

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of wrist worn display devices and more specifically to an electronic digital answer bracelet.

Bracelets of all types are commonly worn on the wrist portion of a person's arm. Watches also are commonly worn on the wrist portion of a person's arm. Another popular device that has been used by people for many years is a product called an answer ball. It is traditionally designed to resemble an eight ball from the game of pool. Inside the hollow spherical shape a multifaceted tetrahedron floats in an opaque liquid. Each facet of the tetrahedron shape has a message printed on it. The spherical shell is opaque except for one window where the user can see one facet of the tetrahedron shape as it makes contact with the window thereby displacing the opaque fluid inside the sphere. To get an answer, the user shakes the ball and one of the facets presents itself to the user thereby giving the user a message that has been printed on that facet.

Although the answer ball has proved to be a well received novelty item that has endured for many years, it has certain deficiencies.

The main one being that the ball is rather heavy and bulky and therefore can not be easily transported by the user. The user may wish to have access to such a device for receiving an answer to a question while traveling, shopping or in any location away from home making the ball inconvenient to use. The other deficiency is that the answer ball provides a fixed and limited amount of flat surfaces to print messages on. Therefore it can not store relatively large numbers of answers.

BRIEF SUMMARY OF THE INVENTION

The primary object of the invention is to provide a bracelet that includes a digital display that shows one of a plurality of pre programmed answer messages which appear after the user has shaken the bracelet.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an answer bracelet comprising: an approximately circular bracelet band suitable for wearing an a person's wrist, a digital display, a microprocessor, a printed circuit board, a momentary start switch, a motion detecting tilt switch, a battery power supply, an audio emitting device, a top cover portion, a bottom cover portion, said bracelet band having a hollowed out portion, said digital display mounted on said printed circuit board and residing in said hollow portion of said bracelet band, said top cover portion attached to said bracelet band so that it covers the said hollowed out portion, said momentary start switch mounted on said printed circuit board and residing in said hollow portion of said bracelet band to one side of said digital display, said microprocessor mounted to said printed circuit board and residing in said hollow portion of said bracelet band under said digital display, said battery power supply residing in said hollow portion of said bracelet under said microprocessor and accessible by removing said bottom cover portion, said audio emitting device mounted on said printed circuit board and residing in said hollow portion inside said bracelet band, said top cover including an aperture for allowing said audio sound to escape, said motion sensing tilt switch mounted to said printed circuit board and electrically wired to said microprocessor, so that when a user presses said start button and shakes said bracelet, said tilt switch sends a signal to said audio emitting device causing a short burst of sound and then said microprocessor randomly selects one of a plurality of messages stored in the memory portion of said microprocessor and displays said message on said digital display for a predetermined period of time and then said message disappears making said bracelet display ready for the next use.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
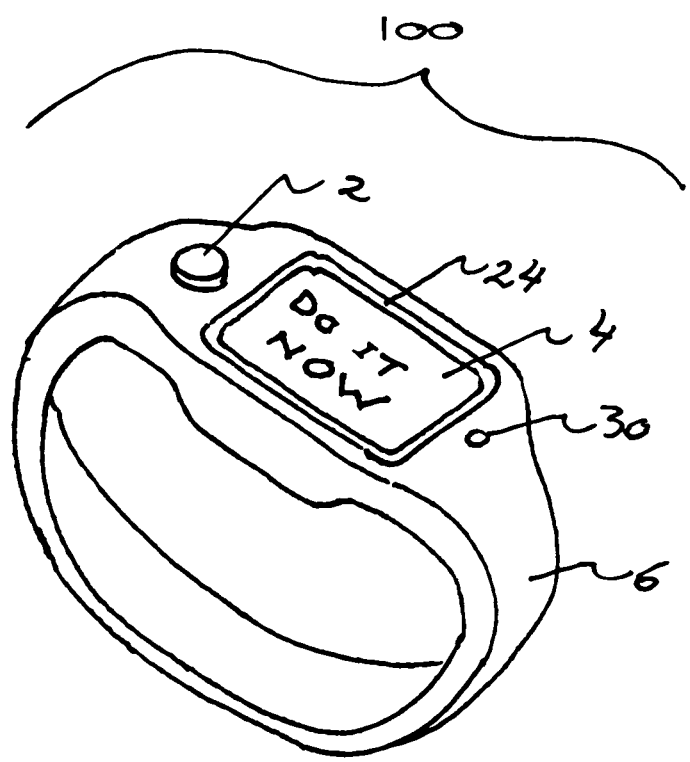
FIG. 1 is a perspective view of the invention.
Figure 2:
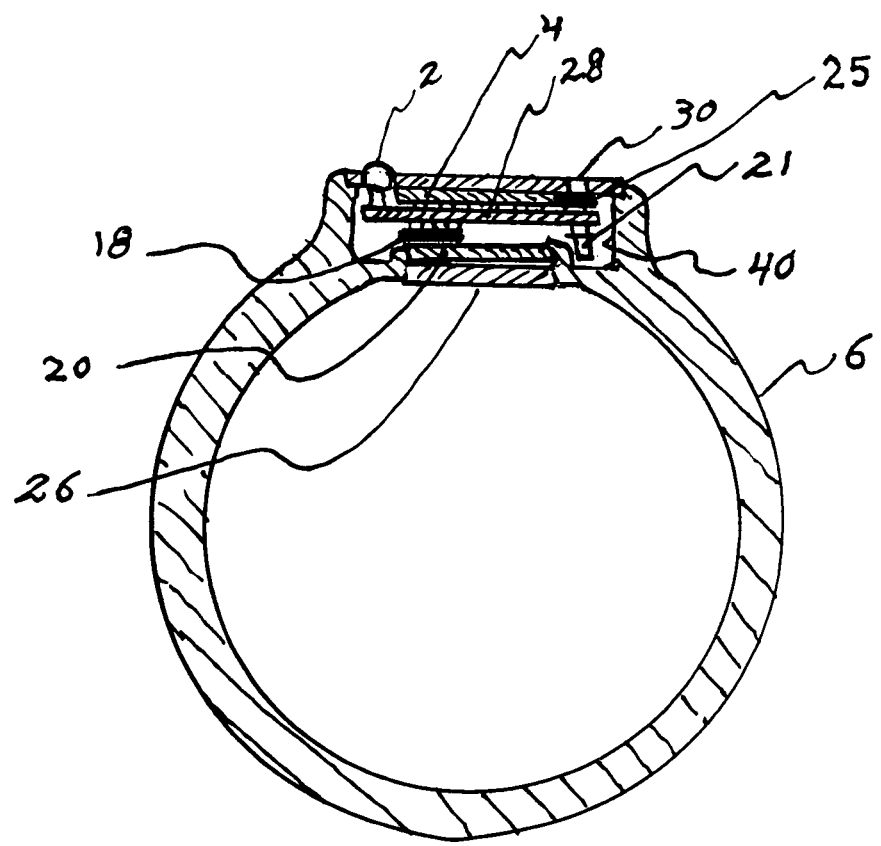
FIG. 2 is a side section view of the invention.

Referring now to FIGS. 1 and 2 we see a perspective view of the invention 100 and a side section view of the invention respectively. A bracelet 6 includes a top portion that has a digital display 4 residing in hollow area 40 and covered by top cover 24. The user wears the bracelet 6 on his or her wrist like a wrist watch. When the user wishes to get an answer to a question, he or she presses on momentary start switch 2 and then shakes the bracelet 6 causing an internal motion detecting tilt switch 21 to close a circuit, letting microprocessor 18 know that the user wishes to have an answer. After a few seconds, the microprocessor 18 instructs a sound making device such as a piezo electric transducer 25, to emit an audio tone through aperture 30 in the top of the bracelet. When the tone stops, a message stored within the memory portion of microprocessor 18 appears on display 4. After a predetermined time, the message disappears so that the device 100 is ready for the next use.

Referring particularly to the side section view in FIG. 2, hollowed out portion 40 contains within it a printed circuit board 28 topped by the digital display 4, which in the preferred embodiment is an LCD type display due to its low cost and low power consumption. momentary start switch 2 is mounted next to display 4 and is accessible through an aperture in the top cover 24. A motion detector tilt switch 21 is wired to the microprocessor 18. Battery 20 is located under the microprocessor 18 and is accessible through a removable bottom panel 26.

Figure 3:
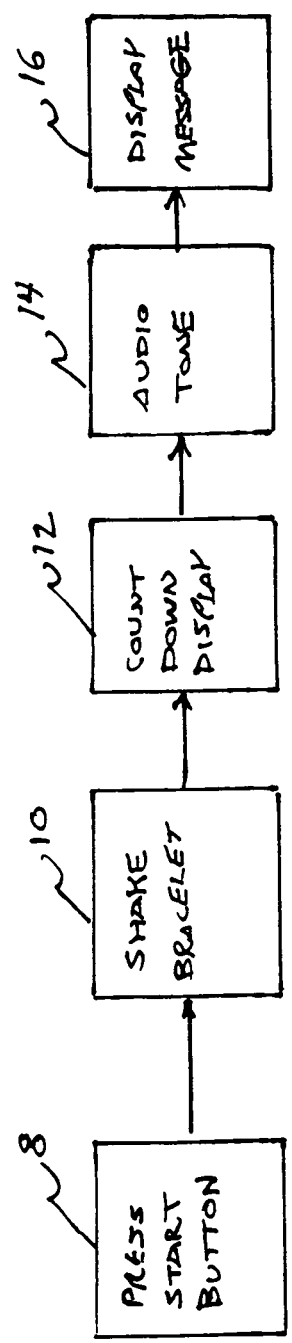
FIG. 3 is a block diagram showing sequence of events of the invention.

FIG. 3 is a block diagram showing the sequence of events of the invention 100 as described above.

Figure 4:
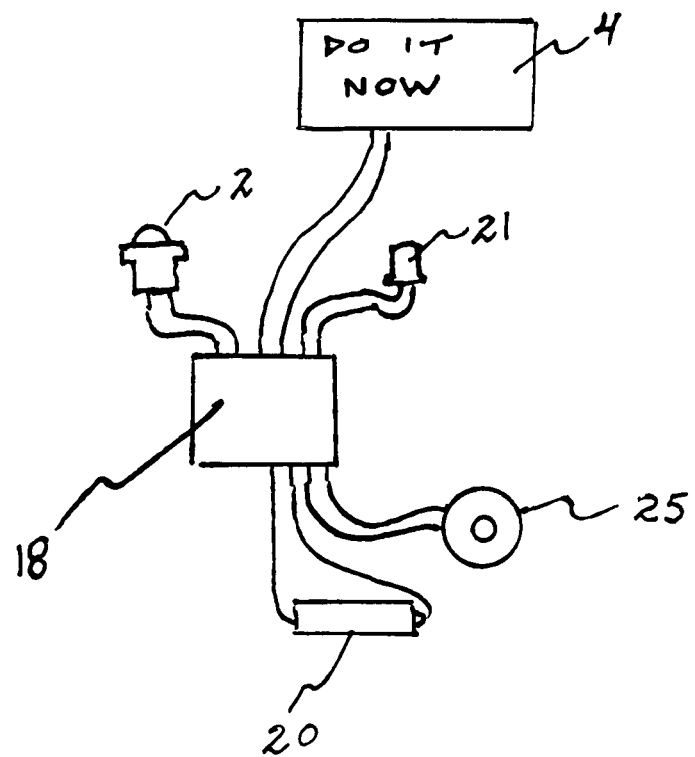
FIG. 4 is a schematic diagram of the invention.

FIG. 4 is a schematic diagram of the invention.

The present invention allows a novel way to obtain an answer to a question. The device is easy to access since it is light weight and worn on a user's wrist. The device uses inexpensive electronic components allowing it to be inexpensive to manufacture resulting in a relatively low retail cost to the consumer.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An answer bracelet comprising:
   an approximately circular bracelet band suitable for wearing an a person's wrist;
   a digital display;
   a microprocessor;
   a printed circuit board;
   a momentary start switch;
   a motion sensing tilt switch;
   a battery power supply;
   an audio emitting device;
   a top cover portion;
   a bottom cover portion;
   said circular bracelet band having a hollowed out portion;
   said digital display mounted on said printed circuit board, both residing in said hollowed out portion of said circular bracelet band;
   said top cover portion attached to said circular bracelet band, covering said hollowed out portion;
   said bottom cover portion forming the underside of said hollow portion;
   said momentary start switch mounted on said printed circuit board and residing in said hollow portion of said circular bracelet band to one side of said digital display under said top cover portion;
   said microprocessor mounted to said printed circuit board and residing in said hollow portion of said circular bracelet band under said digital display;
   said battery power supply residing in said hollow portion and providing electricity to electrical components residing in said hollow portion and accessible by removing said bottom cover portion;
   said audio emitting device mounted on said printed circuit board and residing in said hollow portion of said circular bracelet band;
   said motion sensing tilt switch mounted to said printed circuit board and electrically wired to said microprocessor;
   so that when a user presses said momentary start switch and shakes said bracelet, said motion detecting tilt switch sends a signal to said microprocessor whereupon said microprocessor instructs said audio emitting device to produce a short burst of sound which travels through an aperture in said top cover;
   said microprocessor then randomly selects one of a plurality of messages stored in a memory portion of said microprocessor and displays a message on said digital display for a predetermined period of time and then said message disappears making said bracelet display ready for the next use.

2. An answer bracelet as claimed in claim 1 wherein said digital display is an LCD display.

* * * * *